(12) United States Patent
Anamanamuri

(10) Patent No.: US 10,037,530 B2
(45) Date of Patent: Jul. 31, 2018

(54) PAYMENT RECIPIENT VERIFICATION

(71) Applicant: PAYPAL, INC., San Jose, CA (US)

(72) Inventor: Suresh Anamanamuri, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 896 days.

(21) Appl. No.: 13/917,187

(22) Filed: Jun. 13, 2013

(65) Prior Publication Data
US 2014/0372301 A1 Dec. 18, 2014

(51) Int. Cl.
*G06Q 40/00* (2012.01)
*G06Q 20/40* (2012.01)
*G06Q 20/10* (2012.01)
*G06Q 20/42* (2012.01)

(52) U.S. Cl.
CPC ......... *G06Q 20/4014* (2013.01); *G06Q 20/10* (2013.01); *G06Q 20/401* (2013.01); *G06Q 20/425* (2013.01)

(58) Field of Classification Search
CPC ...................................................... F04Q 40/00
USPC ........................................................ 705/38
See application file for complete search history.

(56) References Cited

U.S. PATENT DOCUMENTS

| | | | | |
|---|---|---|---|---|
| 5,297,031 A * | 3/1994 | Gutterman | ............. | G06Q 40/04 705/37 |
| 5,915,245 A * | 6/1999 | Patterson, Jr. | ......... | G06Q 20/32 340/4.5 |
| 6,161,099 A * | 12/2000 | Harrington | ............ | G06Q 30/08 705/36 R |
| 6,321,212 B1 * | 11/2001 | Lange | .................... | G06Q 40/00 705/35 |
| 6,345,090 B1 * | 2/2002 | Walker | ................... | G06Q 10/02 379/114.03 |
| 6,366,682 B1 * | 4/2002 | Hoffman | .............. | G06K 9/6255 382/115 |
| 6,421,653 B1 * | 7/2002 | May | ....................... | G06Q 30/08 705/36 R |
| 6,493,683 B1 * | 12/2002 | David | .................... | G06Q 20/02 705/37 |
| H2064 H * | 5/2003 | Buchalter | ....................... | 705/37 |
| 6,629,081 B1 * | 9/2003 | Cornelius | .............. | G06Q 20/04 705/30 |
| 6,659,861 B1 * | 12/2003 | Faris | ...................... | A63F 13/12 463/1 |
| 6,732,161 B1 * | 5/2004 | Hess | ...................... | G06Q 30/06 709/219 |
| 6,768,981 B2 * | 7/2004 | Patterson, Jr. | ......... | G06Q 40/00 705/35 |
| 6,892,186 B1 * | 5/2005 | Preist | .................... | G06Q 40/04 705/26.3 |

(Continued)

*Primary Examiner* — Kirsten S Apple
(74) *Attorney, Agent, or Firm* — Haynes and Boone, LLP

(57) ABSTRACT

Methods and systems are provided for sending payments electronically, wherein the user's certainty that the payments are being sent to the correct recipient are substantially enhanced. The user can request information from the recipient to verify the email address or phone number of the recipient. A communication can be sent to the recipient and the communication can request that the recipient send information that verifies the identity of the recipient to the user. For example, the communication can request that the recipient send a picture of the recipient, an audio voice file of the recipient, or a handwriting sample to the user.

21 Claims, 4 Drawing Sheets

(56) References Cited

U.S. PATENT DOCUMENTS

| | | | | |
|---|---|---|---|---|
| 6,952,682 B1* | 10/2005 | Wellman | G06Q 30/08 | 705/1.1 |
| 7,007,076 B1* | 2/2006 | Hess | G06F 12/0223 | 705/37 |
| 7,478,143 B1* | 1/2009 | Friedman | G06Q 30/02 | 709/203 |
| 7,669,759 B1* | 3/2010 | Zettner | G06Q 20/40 | 235/380 |
| 8,001,035 B2* | 8/2011 | Kwan | G06Q 30/08 | 705/35 |
| 8,682,802 B1* | 3/2014 | Kannanari | G06Q 20/3274 | 705/64 |
| 8,762,272 B1* | 6/2014 | Cozens | G06Q 20/10 | 705/40 |
| 2001/0056372 A1* | 12/2001 | Rogan | G06Q 30/02 | 705/14.12 |
| 2002/0049670 A1* | 4/2002 | Moritsu | G06Q 20/04 | 705/40 |
| 2002/0061094 A1* | 5/2002 | Walker | H04M 3/36 | 379/67.1 |
| 2003/0135459 A1* | 7/2003 | Abelman | G06Q 20/02 | 705/40 |
| 2003/0200153 A1* | 10/2003 | Smith, II | G06Q 20/1235 | 705/26.1 |
| 2006/0044153 A1* | 3/2006 | Dawidowsky | G06K 19/0723 | 340/4.3 |
| 2007/0061881 A1* | 3/2007 | Eyre | G06Q 30/0641 | 726/21 |
| 2007/0179885 A1* | 8/2007 | Bird | G06Q 20/04 | 705/39 |
| 2008/0249951 A1* | 10/2008 | Gilder | G06Q 20/04 | 705/76 |
| 2009/0063312 A1* | 3/2009 | Hurst | G06Q 20/105 | 705/30 |
| 2010/0078471 A1* | 4/2010 | Lin | G06Q 40/02 | 235/379 |
| 2011/0131104 A1* | 6/2011 | Rose | G06Q 20/20 | 705/17 |
| 2011/0184843 A1* | 7/2011 | Orttung | G06Q 20/02 | 705/34 |
| 2011/0225064 A1* | 9/2011 | Fou | G06Q 20/12 | 705/26.41 |
| 2012/0191605 A1* | 7/2012 | Foster | G06Q 20/102 | 705/40 |
| 2012/0267432 A1* | 10/2012 | Kuttuva | G06Q 20/223 | 235/379 |
| 2013/0332251 A1* | 12/2013 | Ioannidis | G06Q 20/3224 | 705/14.23 |
| 2013/0339188 A1* | 12/2013 | Mohamed | G06Q 20/027 | 705/26.41 |
| 2014/0244506 A1* | 8/2014 | Gramling | G06Q 20/40 | 705/44 |
| 2014/0304165 A1* | 10/2014 | Salomon | H04W 4/00 | 705/44 |
| 2014/0351147 A1* | 11/2014 | Castrechini | G06Q 30/06 | 705/79 |
| 2015/0006390 A1* | 1/2015 | Aissi | H04N 19/467 | 705/44 |

\* cited by examiner

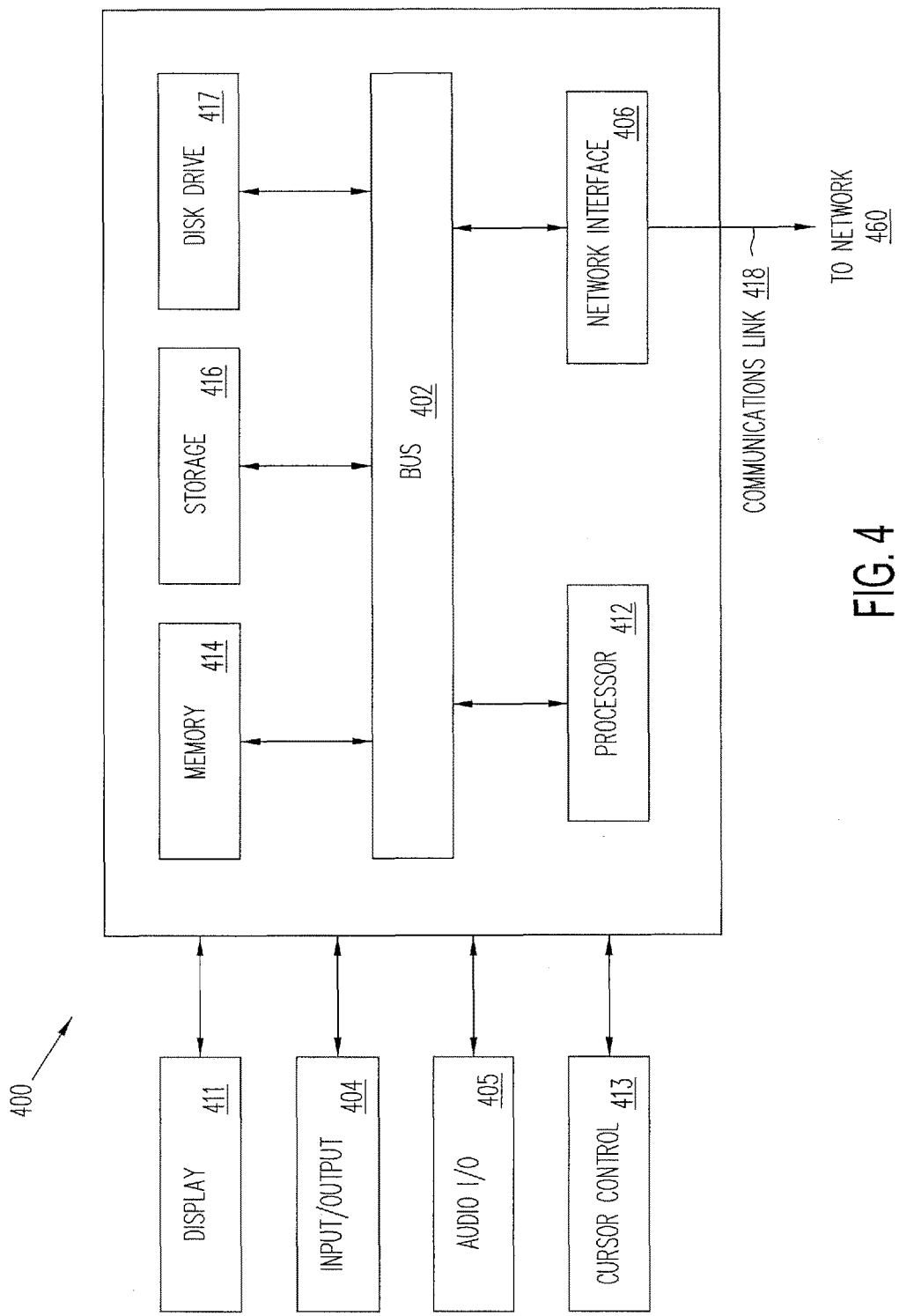

PAYMENT RECIPIENT VERIFICATION

BACKGROUND

Technical Field

The present disclosure generally relates to electronic commerce and, more particularly, relates to methods and systems for verifying an identity of a payment recipient, such as prior to sending a payment to the recipient.

Related Art

Payments can be sent electronically, such as from a person to another person or to a business. For example, such payments can be sent using either an email account or a telephone number of the payment recipient. The sending of such payments can be facilitated by a payment provider, such as Paypal, Inc. For example, the payment provider can perform a transfer of money from an account of a sender to an account of a recipient in response to a communication such as an email or a text message being sent from the sender to the recipient.

The communication can indicate the account from which the payment is to be made, the account to which payment is to be made, and the amount of the payment. For example, the email address or telephone number of the sender can be linked to the sender's account number and the email address or telephone number of the recipient can be linked to the recipient's account number.

However, there can be instances when the sender is unsure of the recipient. For example, the sender can be unsure that the email account or telephone number is correct for the recipient. Even if the sender had previously used the same email account or telephone number to send a payment, there is no guarantee that the email account or telephone number is still valid, e.g., still belongs to the same person or company. Thus, the sender can be reluctant to send payment until the recipient has been verified.

BRIEF DESCRIPTION OF THE DRAWINGS

FIG. 4 is a block diagram of an example of a computer that is suitable for use in the system for payment recipient verification, according to an embodiment.

DETAILED DESCRIPTION

Figure 1:
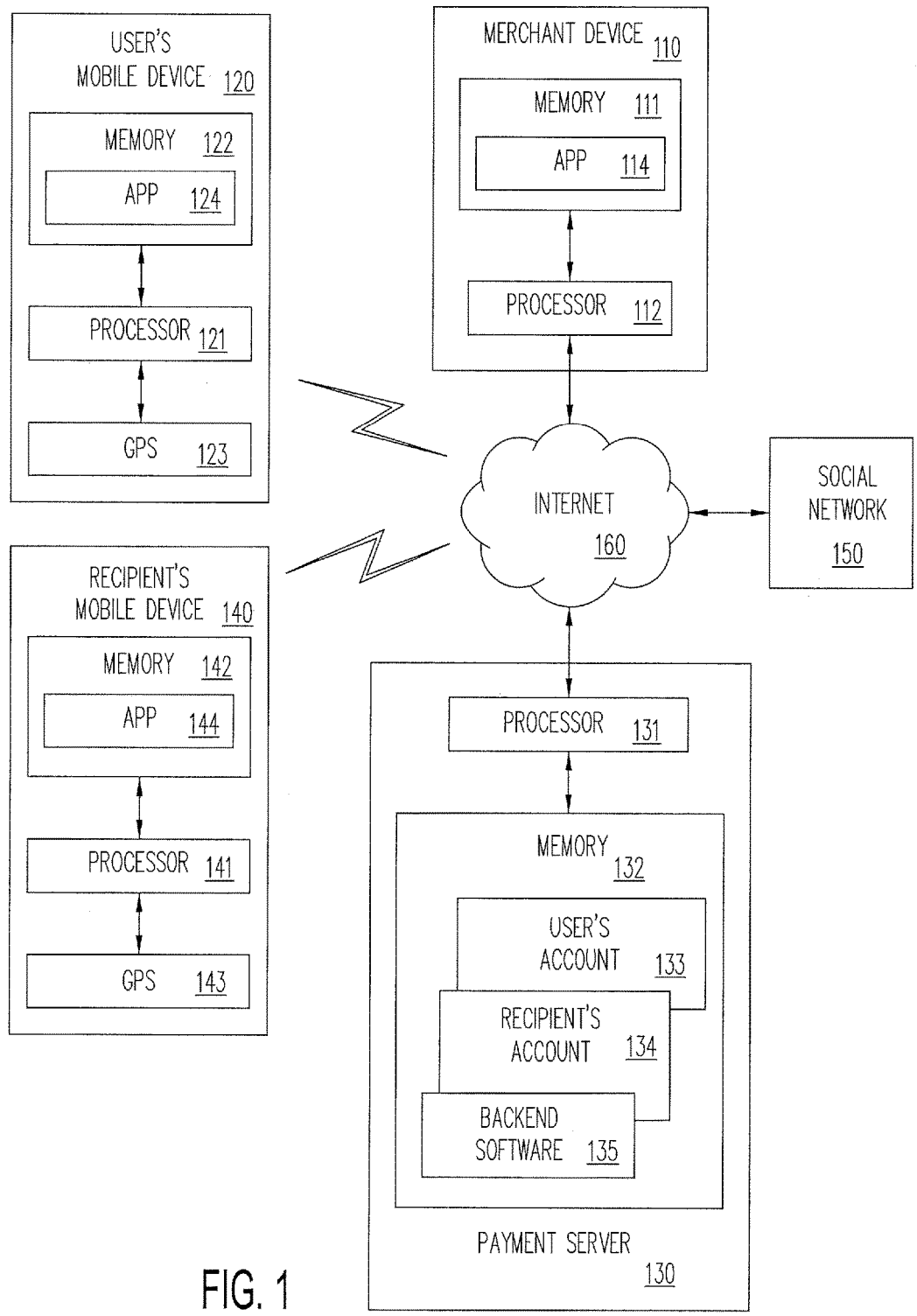
FIG. 1 is a block diagram of a system for payment recipient verification, according to an embodiment.

A person may want to send a payment to another person or to a business electronically, e.g., by using an email address, a phone number, name, or other identifier of the recipient. The person, i.e., a user, can be uncertain whether or not the email address or phone number is correct for the intended recipient. For example, the email address or phone number may have changed since the user last contacted the recipient thereby. The user may simply be unsure of the email address or phone number. In any instance, the user may want to verify the recipient by verifying that the correct email address or phone number is being used to send the payment electronically.

According to an embodiment, the user can request information from the recipient to verify the email address or phone number of the recipient, such as by verifying the identity of the person or company at the email address or phone number. For example, a communication can be sent to the recipient and the communication can request that the recipient send information that verifies the identity of the recipient to the user. Verifying the email address or phone number (or verifying the recipient) can include determining that the email address or phone number is correct for the intended recipient of the payment, e.g. is an email address or phone number of the recipient. By verifying the email address or phone number (or verifying the recipient), the user can increase confidence that the payment will be performed properly.

More particularly, a user who wants to make the payment can start a software program, such as an app on a mobile device of the user. The user can enter the email address or phone number of the recipient, as well as the amount of money to be sent. The app can ask the user if the user wants to verify the recipient, or the user can simply select an "Ask Recipient for Verification" button of the app. After tapping the button, the user can select a way for the recipient to respond, e.g., to identify or verify the recipient. The way for the recipient to respond can include the type of communication, e.g., telephone or email. The way for the recipient to respond can include the type of information to be provided by the recipient, e.g., a picture, voice message, handwriting sample, and/or the like.

The software program can be a web based software program rather than a mobile app. The software program can be a combination of web based software and one or more mobile apps. The software program can include or cooperate with any combination software, firmware, and/or hardware.

According to an embodiment, the user can select from a list one or more different means of verification, i.e., information, which the recipient can send to the user to verify the identity of the recipient to the user. For example, the recipient can send to the user a picture of the recipient, an audio file of the recipient's voice, a handwriting sample of the recipient, and/or any other information that only the recipient can generally provide.

The recipient can send to the user anything that will verify that the recipient is the sender's intended payment recipient. The recipient can send to the user anything that the user and/or the recipient have agreed to in advance, such as during a setup procedure for the payment verification system.

The picture can be required to be a recent picture, such as a picture taken within a predetermined amount of time from receipt of the request. A dated picture can be required. For example, the picture can be required to include a dated newspaper or timestamp. A specific picture can be required. A picture of the recipient with another person or object can be required. A previously taken picture of the recipient with the user can be required. A picture of the recipient at a particular location can be required. For example, a picture of the recipient in the recipient's office can be required.

Generally, the amount of information and the type of information required for verification can depend upon the amount of money being sent. Thus, larger sums of money can require more reliable verification, e.g., more information and/or more unique (to the recipient) information. The amount of information and the type of information for different money amounts can be determined, such as automatically (with or without user verification) by the payment recipient verification system. The amount of information and the type of information can be predetermined by the user, such as during a set up process for the payment recipient verification system.

The handwriting sample can be a picture of handwriting of the user. For example, the handwriting sample can be a picture of a signature of the recipient. The handwriting sample can be obtained by taking a picture of the recipient's handwriting with a user mobile device such as a smart phone having a camera. The handwriting sample can be obtained by the recipient handwriting upon a touchscreen of the user mobile device. The user can specify what words the handwriting sample is to contain.

Similarly, the audio file, the picture of handwriting, or any other means of verification can be required to be accompanied by date verification. The date verification can be manually provided by the recipient, such as by including a picture of a daily newspaper with the response to the user. The date verification can be provided by a service, such as a date stamping service. The date verification can be provided by an app, such a payment recipient verification app executed on the recipient's mobile device, for example. The app can use a date stamping service, for example.

A picture of anything that the user considers acceptable can be provided by the recipient as verification of the recipient's identification. For example, a picture of the recipient's home, spouse, kids, car, office, or pet can be sent, as well as an item the sender gave to the recipient.

The recipient can provide the user with any information that identifies the recipient to the user. The exact information, the type of information, and/or one or more characteristics of the information can be predetermined or prearranged between the user and the recipient, such as prior to, during, or subsequent to a setup process for the payment recipient verification system. The recipient can be requested, such as via the payment recipient verification app of the user, to provide the information requested to the user.

The payment recipient verification app of the user can cooperate with the payment recipient verification app of the recipient to verify the recipient. The payment recipient verification app of the user and/or the payment recipient verification app of the recipient can cooperate with any other device, e.g., backend software of a payment server, to verify the recipient.

The app can verify the recipient for every payment, for payments to email addresses or phone numbers that have not been used for a predetermined amount of time, for all recipients, for selected recipients, and/or for recipients that fit a particular profile (that have predetermined characteristics). The payment recipient verification app of the user can cooperate with the payment recipient verification app of the recipient to verify the user autonomously. Thus, verification can be performed with little or no interaction from the user and/or the recipient.

The app can be configured so that user can confirm that verification information is to be requested and/or the recipient can confirm that verification information is to be sent. Such confirmation can apply to all verification requests and/or responses. Such confirmation can apply to selected verification requests and/or responses according to any desired criteria.

The recipient can be asked to provide a code (such as a code word or a code phrase) or to an answer to a security question. For example, the recipient can be asked to provide the recipient's mother's maiden name, name of the recipient's first car, city of birth, name of pet, or the like.

The recipient can be asked to provide a combination of items. The number of items that the recipient is required to provide can depend upon the amount of the payment being sent. Lesser amounts of money can necessitate that fewer items are required from the recipient for verification while greater amounts of money can necessitate that more items are required from the recipient for verification.

Either the user or the recipient can pick the verification information or combination of items used to verify the recipient. For example, the recipient can be sent a list of acceptable verification information items from which the recipient can select which to send to the user for verification.

Upon receipt of the verification information, the user can have the opportunity to either okay the payment or can deny the payment. Thus, if the user believes that the verification information adequately verifies the identity of the recipient, then the payment can be sent. The user can indicate whether or not the recipient has been identified and the payment is to be sent via the app, such as by tapping a "Recipient Verified" button on the screen of the user device.

The payment recipient verification system can automatically check or verify the verification information. For example, a face recognition algorithm can be used to verify that the picture is a picture of the recipient. Similarly, an object recognition algorithm (such as a machine vision algorithm) can be used to verify that one or more objects in the picture verify the recipient. As a further example, a voice recognition algorithm can be used to verify that the voice is the voice of the recipient. As yet a further example, a handwriting analysis algorithm can verify that the handwriting sample is handwriting of the recipient. One or pictures of the recipient, voice samples of the recipient, and/or handwriting samples of the recipient can be stored in the account or in a database to facilitate such automatic verification. The payment recipient verification system can automatically check the verification information and the user can perform a final check of the verification information.

According to an embodiment, the user can be notified by the payment recipient verification system regarding a status of the information. For example, the user can be notified if the information has verified the recipient or has not verified the recipient. If payment recipient verification system did not verify the recipient, the user can be provided with an opportunity to review the information and to verify the recipient, if appropriate. For example, if the recipient verification system did not verify the picture, the voice file, or the handwriting sample, then the user can be provided with an opportunity to verify the picture, the voice file, or the handwriting sample. Thus, the user can override the recipient verification system. The user can override positive verifications (where the recipient was verified) and/or negative verifications (where the recipient was not verified).

According to an embodiment, the user can request further verification if the user remains in doubt of the recipient's identification after receiving the verification information. For example, if the recipient provides a picture of handwriting and the user is not certain that the handwriting belongs to the intended recipient, then the user can request that the recipient provide further verification, such as another handwriting sample (such as with specific wording included), a picture, or a voice file of the recipient. Comments can be provided by the user, such as regarding the handwriting sample, the picture, or the voice file. For example, the recipient can be instructed to writing more clearly, focus the picture more carefully, or talk more slowly. Such comments can be provided by the user and/or by the payment recipient verification system.

The payment recipient verification process can allow the user to send the payment after verifying the recipient's information. In this manner, the user can complete the payment and verification operations through a payment provider, such as Paypal, Inc. Thus, the user can make payments with enhanced confidence that they are being made properly, e.g., to the correct person or business. After verification, the payment can be sent to the recipient, either automatically by the payment recipient verification system or by the use According to an embodiment, a payment recipient verification system can comprise one or more memories and one or more hardware processors. The one or more memories and one or more hardware processors can be part of the same device, e.g., server. For example, the one or more memories and one or more hardware processors can be part of the same payment server. The one or more memories and one or more hardware processors can be part of the different devices, e.g., servers, mobile devices, and the like. The one or more memories and one or more hardware processors can be co-located. The one or more memories and one or more hardware processors can be located in different places, e.g., different rooms, different buildings, different cities, different states, and/or different countries.

The one or more memories can store information about an account for a plurality of users. The information can include verification information that can be used to verify a payment recipient. The information can include account balances. The information can include identification information regarding users. One or more hardware processors in communication with the one or more memories can receive a first communication including an indication of a desire of a user to verify the payment recipient. The one or more processors can send a second communication to the payment recipient requesting for the payment recipient to send the verification information to the user. The one or more processors can receive a third communication including an indication that the user has received the verification information. The one or more processors can transfer the payment from an account of the user to an account of the payment recipient in response to receiving the third communication.

The one or more hardware processors can access the one or more memories to determine what verification information to request for the payment recipient to send to the user. The system verification information comprises a picture of the payment recipient. The verification information can comprise an audio file of a voice of the payment recipient. The verification information can comprise a handwriting sample of the payment recipient.

The one or more hardware processors can access outside resources, such as databases of other systems. For example, the one or more hardware processors of a payment provider can access databases of merchants, credit card companies, social networks, other Internet resources, and the like. Such other databases can be access to determine what information is to be requested from the recipient and/or to verify the information.

The one or more hardware processors can receive an account number of the user and can receive a telephone number of the payment recipient. The one or more hardware processors can determine, at least in part, from information representative of the account number (such as the use's telephone number) and/or the telephone number, the verification information. The verification information can be unique to a particular user. The type of verification information can vary among users. Thus, some user can be required to provide photographs while other users are required to provide voice files, for example.

The one or more hardware processors can receive an account number of the user and can receive an email address of the payment recipient. The one or more hardware processors can determine, at least in part, from information representative of the account number (such as the use's email address) the account number and/or the email address, the verification information.

According to an embodiment, a payment recipient verification method can comprise storing, such as in one or more memories, information about an account for a plurality of users. The information can include verification information that can be used to verify a payment recipient. The method can include receiving, electronically by one or more hardware processors, a first communication including an indication of a desire of a user to verify the payment recipient. The method can include sending, by the one or more processors, a second communication to the payment recipient requesting for the payment recipient to send the verification information to the user. The method can include receiving, by the one or more processors, a third communication including an indication that the user has received the verification information. The method can include transferring, by the one or more processors, the payment from an account of the user to an account of the payment recipient in response to receiving the third communication. The method can comprise accessing, by the one or more processors, the one or more memories to determine what verification information to request for the payment recipient to send to the user.

The method can comprise receiving, by the one or more processors, an account number of the user. The method can comprise receiving, by the one or more processors, a telephone number of the payment recipient. The method can comprise determining, by the one or more processors, at least in part, from the account number or the telephone number, the verification information.

The method can comprise receiving, by the one or more processors, an account number of the user. The method can comprise receiving, by the one or more processors, an email address of the payment recipient. The method can comprise determining at least in part, from the account number or the email address, the verification information.

According to an embodiment, a computer program product can comprise a non-transitory computer readable medium having computer readable and executable code for instructing one or more processors to perform a payment recipient verification method. The method can comprise storing information about an account for a plurality of users. The information can include verification information that can be used to verify a payment recipient. The method can comprise receiving a first communication including an indication of a desire of a user to verify the payment recipient. The method can comprise sending a second communication to the payment recipient requesting for the payment recipient to send the verification information to the user. The method can comprise receiving a third communication including an indication that the user has received the verification information. The method can comprise transferring the payment from an account of the user to an account of the payment recipient in response to receiving the third communication.

The method can comprise accessing, by the one or more processors, the one or more memories to determine what verification information to request for the payment recipient to send to the user. The verification information can comprise a picture of the payment recipient, an audio file of a voice of the payment recipient, and/or a handwriting sample of the payment recipient.

The method can further comprise receiving an account number of the user, receiving a telephone number of the payment recipient, and determining at least in part, from the account number or the telephone number, the verification information. The method can further comprise receiving an account number of the user, receiving an email address of the payment recipient, and determining at least in part, from the account number or the email address, the verification information.

According to an embodiment, a computer program product can comprise a non-transitory computer readable medium. The non-transitory computer readable medium can have computer readable and executable code for instructing one or more processors to perform any of the methods disclosed herein.

FIG. 1 is a block diagram of a system for payment recipient verification according to an embodiment. The system can include a merchant device 110, a user's mobile device 120, a payment server 130, and/or a recipient's mobile device 140. The functions discussed herein can be split and/or shared among the merchant device 110, the user's mobile device 120, the payment server 130, and/or a recipient's mobile device 140 as desired.

The merchant device 110 can comprise a merchant checkout terminal, a computer, and/or a server, for example. The merchant device 110 can be located in a retail store, a warehouse, an office, a server farm, a facility of an online seller, or any other location. The merchant device 110 can include a memory 111, and a processor 112. The merchant device 110 can be used for processing purchases from the merchant and/or for any other purpose. A merchant can be the recipient and/or the merchant device 110 can be used for providing the verification information. The merchant can be a brick and mortar merchant. The merchant can be an online merchant. The memory 111 can store verification information for the merchant and/or any other recipient. The memory 111 can store an app 114 and/or the processor 112 can execute the app 114.

The user's mobile device 120 can be carried by the user. The user's mobile device 120 can comprise a cellular telephone, a smart telephone, a hand held computer, a laptop computer, a notebook computer, or a tablet computer, for example. The user's mobile device 120 can include a processor 121, a memory 122, and a global positioning system (GPS) 123.

The user's mobile device 120 can be used for routine telephone calls, text messaging, web browsing, and the like. The user's mobile device 120 can be used for performing payment recipient verification, e.g., requesting and obtaining payment recipient verification information. Thus, the user can request payment recipient verification information via the user's mobile device 120 and can receive the payment recipient verification information via the user's mobile device 120. The memory 122 can store verification information for the recipient. The stored verification information can be used, for example, to check the validity of received verification information.

An app 124 can be stored in the memory 122 and executed by the processor 121. The app 124 can be used for requesting the payment recipient verification information, and/or for receiving the payment recipient verification information. The app 124 can also be used for verifying the payment recipient verification information, either automatically as discussed herein, or manually by the user.

The recipient's mobile device 140 can be carried by the recipient. The recipient's mobile device 140 can comprise a cellular telephone, a smart telephone, a hand held computer, a laptop computer, a notebook computer, or a tablet computer, for example. The recipient's mobile device 140 can include a processor 141, a memory 142, and a global positioning system (GPS) 143. The memory 142 can store the verification information.

The recipient's mobile device 140 can be used for routine telephone calls, text messaging, web browsing, and the like. The recipient's mobile device 140 can be used for requesting and obtaining payment recipient verification information. The user can request payment recipient verification information from the recipient's mobile device 140 and can receive the payment recipient verification information from the recipient's mobile device 140.

An app 144 can be stored in the memory 142 and executed by the processor 141. The app 144 can be used for requesting the payment recipient verification information and for receiving the payment recipient verification information. The app 144 can also be used for verifying the payment recipient verification information, either automatically as discussed herein, by manually by the user.

Automatic and/or manual verification can depend, at least in part, upon a time and/or location. Thus, automatic verification can be denied if the recipient in at a location that is unlikely or unexpected at a particular time (or at any time). For example, if the recipient is expected (such as by the user and/or by the payment recipient verification system) to be in Los Angeles, Calif. at 10:30 AM on a Monday morning, but the GPS 143 of the recipient's mobile device indicates that the recipient is in Tokyo, Japan at that time, then the electronic payment can be denied.

Similarly, if the user is at a location that is unlikely or unexpected at a particular time (or at any time), then the electronic payment can be denied. Thus, the location of the user and/or the recipient can be used to determine if the payment is to be made. Geographic and time limits for money transfers can be defined, such as by the user during a setup process. Thus, times and locations can be used to limit money transfers by the payment recipient verification system.

The payment server 130 can comprise a server of a payment provider, such as Paypal, Inc. The payment server 130 can comprise any type of server of any entity. The payment server 130 can be a single server or can be a plurality of servers. The server payment 130 can include one or more processors 131 and a memory 132. The memory 132 can be a memory of the payment server 130 or a memory that is associated with the payment server 130. The memory 132 can be a distributed memory. The memory 132 can store a user account 133 and a merchant account 134.

The payment server 130 can be used for storing payment recipient verification information, requesting the payment recipient verification information, and verifying the payment recipient verification information. The server 130 can be used to search for verification information, such as to search the Internet and/or various databases for the verification information. The payment server 130 can be used to facilitate electronic payment from the user to the recipient.

Generally, the merchant device 110, the user's mobile device 120, the payment server 130, and/or the recipient's mobile device 140 can perform functions discussed herein. That is, at least to some extent, a function that is discussed herein as being performed via a particular one of these devices can be performed by a different one of these devices, by a combination of these devices, and/or by other devices.

According to an embodiment, a social network 150 can be used, at least in part, to facilitate payment recipient verification. For example, a picture, audio file, and/or handwriting sample obtained from a prospective payment recipient can be compared to a corresponding picture, audio file, and/or handwriting sample from the social network for the prospective payment recipient to verify, at least partially, the identity of the recipient. The social network 150 can be used, at least in part, to determine what verification information is to be requested, to provide the verification information for comparison to that provided by the recipient, and/or to facilitate communication with the recipient. The payment server 130 can be a server of the social network 150.

The merchant device 110, the user's mobile device 120, the recipient's mobile device 140, the social network 150, and the payment server 130 can communicate with one another via a network, such as the Internet 160. The merchant device 110, the user's mobile device 120, the recipient's mobile device 140, the social network 150, and the payment server 130 can communicate with one another via one or more networks, such as local area networks (LANs), wide area networks (WANs), cellular telephone networks, and the like. The merchant device 110, the user's mobile device 120, the recipient's mobile device 140, the social network 150, and the payment server 130 can communicate with one another, at least partially, via one or more near field communications (NFC) methods or other short range communications methods, such as infrared (IR), Bluetooth, WiFi, and WiMax.

The app 114, the app 124, and the app 144 can be substantially identical apps. Alternatively, the app 114, the app 124, the app 144 can be substantially different apps. For example, the app 114 of the merchant device 110 can include merchant specific functions such as validating credit cards and the like which can be absent from the app 124 and the app 144.

The memory 132 of the payment server 130 can contain backend software 135 that cooperates with the app 114, the app 124, and the app 144. The backend software 135 can facilitate verification and/or can facilitate payment, as well as perform any other desired functions. The backend software 135 can cooperate with a database, such as a database of verification information stored in the memory 132 to perform verification. The database can be a database of the merchant device 110, the user's mobile device 120, the recipient's mobile device 140, the social network 150, the payment server 130, and/or any other device.

FIG. 1 illustrates an exemplary embodiment of a network-based system for implementing one or more processes described herein. As shown, the network-based system may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Figure 2:
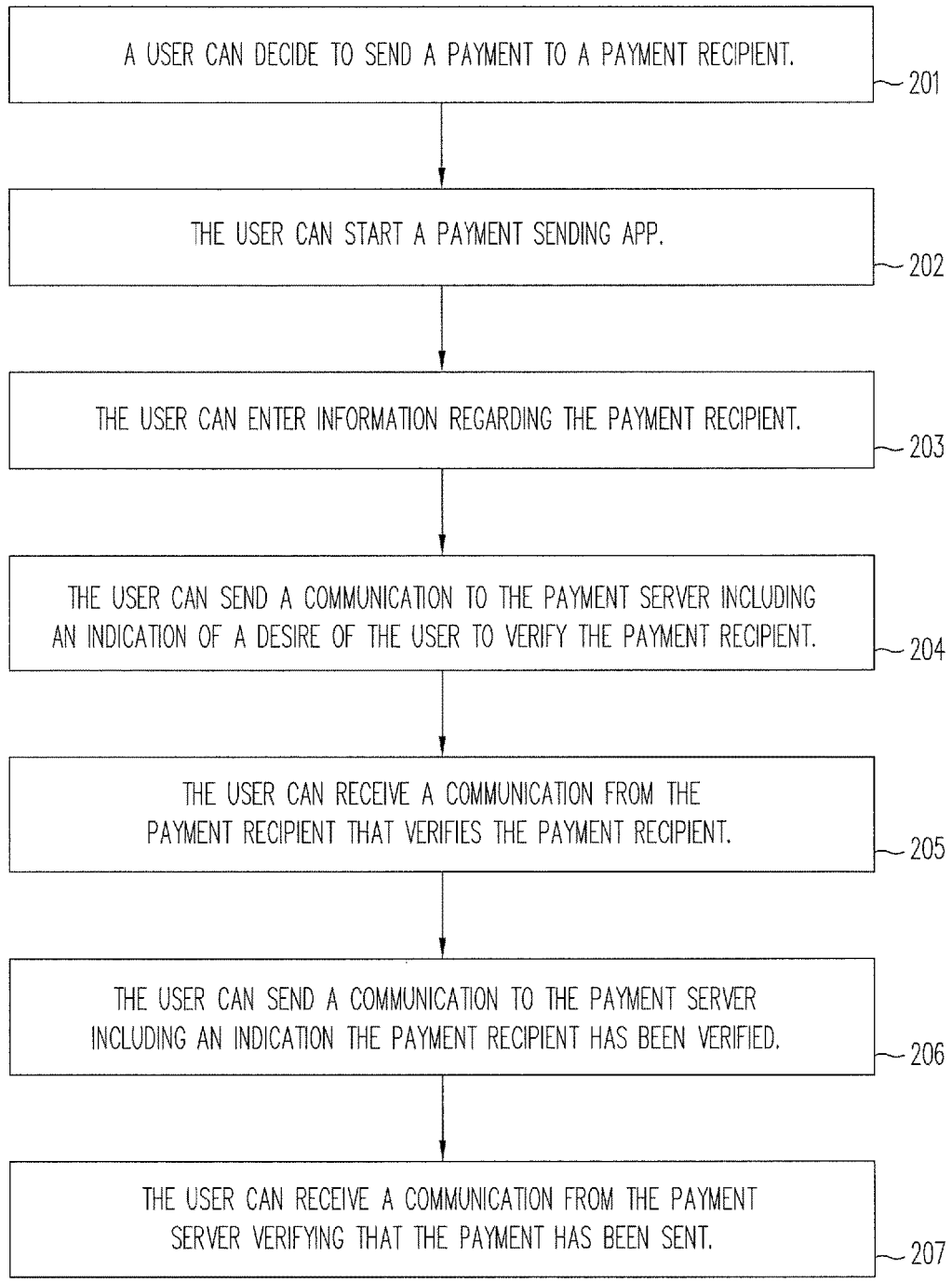
FIG. 2 is a flow chart showing a method for payment recipient verification, according to an embodiment.
Figure 3:
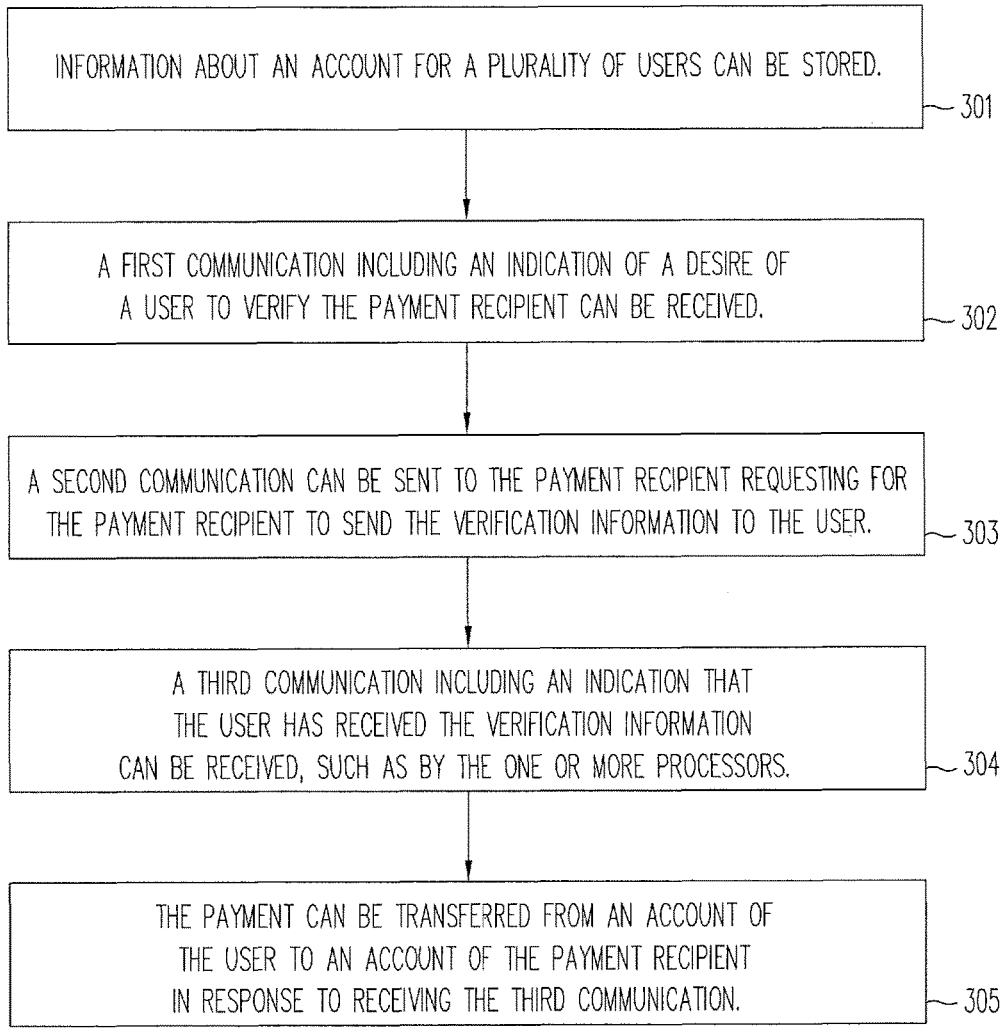
FIG. 3 is a flow chart showing further detail of the method for payment recipient verification, according to an embodiment.

FIGS. 2 and 3 are flow charts that describe examples of operation of the payment recipient verification system according to embodiments thereof. Note that one or more of the steps described herein may be combined, omitted, or performed in a different order, as desired or appropriate.

FIG. 2 is a flow chart showing a method for payment recipient verification, according to an embodiment. A user can decide to send a payment to a payment recipient, as shown in step 201. The payment can be from the user to a person, a group, a non-profit company, a charity, a store, a merchant, a business, or any other entity. The payment can be for the purchase of a product, for a donation, for a gift, or for any other reason. The sending of the payment can be facilitated via a payment provider or in any other manner.

The payment can be sent using an email address of the recipient. For example, the payment can be sent by indicating the amount of the payment in an email to the recipient. The email can be copied or otherwise communicated to the payment server 130 such that the payment server can facilitate the money transfer. The app 124 can facilitate such communication with the payment server 130.

The payment can be sent using a phone number of the recipient. For example, the payment can be sent by indicating the amount of the payment in a text or voice message to the recipient. The text or voice message can be copied or otherwise communicated to the payment server 130 such that the payment server can facilitate the money transfer. The app 124 can facilitate such communication with the payment server 130.

The payment can be sent using a user name of the recipient from a social network. For example, the payment can be sent by indicating the amount of payment in a text message to the recipient's social network.

The user can start a payment sending app 124, as shown in step 202. The app 124 can be executed on a device of the user, such as the user's mobile device 120. The app 124 can be executed on a desktop computer of the user or on any other device or combination of devices of the user and/or of any other entity.

The user can enter information regarding the payment recipient via the user's mobile device 120, as shown in step 203. For example, the user can enter the payment recipient's email address or telephone number. The user can enter the payment recipient's name, address, payment provider account number and/or any other information. The user can enter information that identifies the payment recipient. For example, the user can enter information that identifies the payment recipient to the payment provider. The user can enter a payment amount.

The user can send a communication via the user's mobile device 120 to the payment server 130 including an indication of a desire of the user to verify the payment recipient, as shown in step 204. In response to this communication, the payment server 130 can send a request to the recipient that requests that the recipient provide verification information to the user. The app 124 can send the request directly from the user's mobile device 120 to the recipient's mobile device 140. The communication requesting that the recipient provide the verification information can specify what verification information is acceptable.

The recipient's mobile device 140 can be configured to automatically reply to the communication requesting verification of the recipient. For example, the app 144 of the recipient's mobile device 140 can receive the communication requesting verification information and can respond to the request with the desired information. The recipient's mobile device can respond to the request autonomously, e.g., without interaction from the recipient. Alternatively, authorization from the recipient can be required for the response.

The user can receive a communication via the user's mobile device 120 from the payment recipient that verifies the payment recipient, as shown in step 205. This communication can come directly from the recipient or can be received via an intermediary, such as the payment server 130. This communication can contain information that is generally readily available or only available to the recipient. The information can vary from being very reliable for verifying the recipient to being slightly or somewhat reliable for verifying the recipient. The user can determine what information is required and thus can determine how reliable the information is for verifying the recipient. Thus, the user can verify the recipient with a desired degree of confidence.

After the user verifies the payment recipient via the user's mobile device 120, the user can send a communication to the payment server including an indication the payment recipient has been verified, as shown in step 206. Verifying the payment recipient can comprise comparing information provided by the payment recipient to information in the user's memory (e.g., in the user's head), comparing information provided by the payment recipient to information in the memory 122 of the user's mobile device 120, or comparing information provided by the payment recipient to any other information.

The user can receive a communication via the user's mobile device 120 verifying that the payment has been sent, as shown in step 207. The communication can be received from the payment server 130, for example. Thus, the payment server 130 can facilitate the payment from the user to the recipient and can then verify to the user that the payment has been made.

FIG. 3 is a flow chart showing further detail of the method for payment recipient verification, according to an embodiment. Information about an account for a plurality of users can be stored, as shown in step 301. The information can be stored in the one or more memories 132 of the payment server 130, for example. The information can include verification information that can be used to verify a payment recipient.

A first communication including an indication of a desire of a user to verify the payment recipient can be received by a payment server 130, as shown in step 302. The first communication can be received electronically, such as by one or more hardware processors 131 of the payment server 130, for example.

A second communication can be sent to the payment recipient via the recipient's mobile device 140 requesting for the payment recipient to send the verification information to the user, as shown in step 303. The second communication can be sent by the one or more processors 131, for example.

A third communication can be receive from the user's mobile device 120 by the payment server 130 including an indication that the user has received the verification information can be received, such as by the one or more processors 131, as shown in step 304. The third communication can be received by the one or more processors 131, for example.

The payment can be transferred from an account of the user to an account of the payment recipient in response to receiving the third communication, as shown in step 305. The payment can be transferred by the one or more processors 131, for example.

The one or more memories and/or the one or more processors can be one or more memories and/or the one or more processors of the merchant device, 110, the user device 120, the payment server 130, the social network 150, and/or any other device or system. Memories and/or processors from any number of devices, systems, and entities can cooperate to perform the payment recipient verification method disclosed herein.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments described herein use an email address or phone number, those skilled in the art will appreciate that other user identifiers may also be suitable. For example, a user name from a social site or other site, a Twitter handle, or the like may be used instead of or in addition to the email address or the phone number. As such, use of the email address and phone number are by way of example only, and not by way of limitation.

As used herein, the term "store" can include any business or place of business. The store can be a brick and mortar store or an online store. Examples of stores can include supermarkets, discount stores, book stores, convenience stores, restaurants, gas stations, auto repair shops, and movie theaters. The store can be any person or entity that sells a product and/or provides a service.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, hotel rooms, automotive repair, haircuts, digital music, and books. The product can be a single item or a plurality of items. For example, the product can be a tube of toothpaste, a box of laundry detergent, three shirts, and a donut.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the term "verify" can include determining an identity. Thus, verifying a recipient can include verifying that the recipient is the person to whom payment is intended to be sent.

Thus, as discussed herein, the user can request information from the recipient that helps to verify the recipient as being the correct and intended recipient of an electronic payment. The information can be any information that the recipient is likely to have and that others are unlikely to have. In this manner, the user can send the payment with enhanced confidence that the payment is being made correctly.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system for verifying an identity of a payment recipient comprising:
    a non-transitory memory; and
    one or more hardware processors coupled to the non-transitory memory and configured to read instructions from the non-transitory memory to cause the system to perform operations comprising:
        receiving, from a first device corresponding to a user via an electronic network, a first request to transfer funds to the payment recipient, wherein the first request comprises identification information that identifies a payment account of the payment recipient;
        in response to receiving the first request, transmitting, to a second device corresponding to the payment recipient via the electronic network, a second request to provide time information and location information;
        receiving electronic time information and electronic location information from a global positioning system (GPS) unit included in the second device;
        comparing the electronic time information with an expected time and the electronic location information with an expected location associated with the payment recipient;
        presenting, on the first device, an interface that enables the user to select a first biometric data type from among a plurality of biometric data types for authenticating the payment recipient;
        in response to receiving a selection of the first biometric data type, automatically transmitting, to the second device via the electronic network, a third request for biometric data of the payment recipient corresponding to the first biometric data type without intervention from the user, wherein the requested biometric data is different from the identification information;
        receiving the biometric data from the second device via the electronic network;
        verifying the identity of the payment recipient by (i) applying a biometric analysis algorithm on the received biometric data and (ii) determining that the received biometric data was obtained from the payment recipient within a predetermined period of time of the third request; and
        in response to the verifying the identity of the payment recipient, automatically transferring the funds from an account of the user to the payment account.

2. The system of claim 1, wherein the received biometric data comprises an image of the payment recipient.

3. The system of claim 1, wherein the received biometric data comprises an audio file of a voice of the payment recipient.

4. The system of claim 1, wherein the received biometric data comprises an image of handwriting of the payment recipient or an image known by the user to be associated with the payment recipient.

5. The system of claim 1, wherein the operations further comprise receiving an account number of the user, wherein the identification information comprises a telephone number of the payment recipient, and wherein the third request for the biometric data is determined based at least in part on the account number and the telephone number.

6. The system of claim 1, wherein the operations further comprise receiving an account number of the user, wherein the identification information comprises an email address of the payment recipient, and wherein the third request for the biometric data is determined based at least in part on the account number and the email address.

7. The system of claim 1, wherein the first request further comprises a payment amount, wherein the operations further comprise:
    determining a volume of biometric data corresponding to the first biometric data type required to verify the identity of the payment recipient based on the payment amount and the first biometric data type, wherein the third request comprises an indication of the determined volume of the biometric data.

8. The system of claim 7, wherein the first biometric data type comprises a handwriting data type, wherein determining the volume of biometric data comprises determining a number of handwritten letters required from the payment recipient.

9. The system of claim 1, wherein the first biometric data type comprises an image of the payment recipient, wherein the third request comprises a time requirement regarding when the image of the payment recipient is captured.

10. A method comprising:
    receiving, via an electronic network by one or more hardware processors, a first request from a first device of a user to transfer funds to a payment recipient, wherein the first request comprises identification information that identifies a payment account of the payment recipient;
    in response to receiving the first request, transmitting, by the one or more hardware processors to a second device associated with the payment recipient via the electronic network, a second request to provide time information and location information;
    receiving, by the one or more hardware processors, electronic time information and electronic location information from a global positioning system (GPS) unit of the second device;
    comparing, by the one or more hardware processors, the electronic time information with an expected time and the electronic location information with an expected location associated with the payment recipient;
    presenting, by the one or more hardware processors on the first device, an interface that enables the user to select a first biometric data type from among a plurality of biometric data types for authenticating the payment recipient;
    in response to receiving a selection of the first biometric data type, automatically transmitting, by the one or more hardware processors to the second device via the electronic network, a third request for biometric data of the payment recipient corresponding to the first biometric data type without intervention from the user, wherein the requested biometric data is different from the identification information;

receiving, by the one or more hardware processors, the biometric data from the second device via the electronic network;

verifying, by the one or more hardware processors, an identity of the payment recipient by (i) applying a biometric analysis algorithm on the received biometric data and (ii) determining that the received biometric data was obtained from the payment recipient within a predetermined period of the third request; and in response to the verifying the identity of the payment recipient, automatically transferring, by the one or more hardware processors, the funds from an account of the user to the payment account.

11. The method of claim 10, wherein the received biometric data comprises an image of the payment recipient.

12. The method of claim 10, wherein the received biometric data comprises an audio file of a voice of the payment recipient.

13. The method of claim 10, wherein the received biometric data comprises an image of handwriting of the payment recipient or an image known by the user to be associated with the payment recipient.

14. The method of claim 10, further comprising:
receiving, by the one or more hardware processors, an account number of the user, wherein the identification information comprises a telephone number of the payment recipient, and wherein the third request for the biometric data is determined based at least in part on the account number and the telephone number.

15. The method of claim 10, further comprising:
receiving, by the one or more hardware processors, an account number of the user, wherein the identification information comprises an email address of the payment recipient, and wherein the third request for the biometric data is determined based at least in part on the account number and the email address.

16. A non-transitory machine-readable medium having stored thereon machine-readable instructions executable to cause a machine to perform operations comprising:
receiving, from a first device of a user via an electronic network, a first request to transfer funds to a payment recipient, wherein the first request comprises identification information that identifies a payment account of the payment recipient;

in response to receiving the first request, transmitting, to a second device corresponding to the payment recipient via the electronic network, a second request to provide time information and location information;

receiving electronic time information and electronic location information from a global positioning system (GPS) unit included in the second device;

comparing the electronic time information with an expected time and the electronic location information with an expected location associated with the payment recipient;

presenting, on the first device, an interface that enables the user to select a first biometric data type from among a plurality of biometric data types for authenticating the payment recipient;

in response to receiving a selection of the first biometric data type, automatically transmitting, to the second device via the electronic network, a third request for biometric data of the payment recipient corresponding to the first biometric data type without intervention of the user, wherein the requested biometric data is different from the identification information;

receiving the biometric data from the second device via the electronic network;

verifying an identity of the payment recipient by (i) applying a biometric analysis algorithm on the received biometric data and (ii) determining that the received biometric data was obtained from the payment recipient within a predetermined period of time of the third request; and in response to the verifying the identity of the payment recipient, automatically transferring the funds from an account of the user to the payment account.

17. The non-transitory machine-readable medium of claim 16, wherein the received biometric data comprises an image of the payment recipient.

18. The non-transitory machine-readable medium of claim 16, wherein the received biometric data comprises an audio file of a voice of the payment recipient.

19. The non-transitory machine-readable medium of claim 16, wherein the received biometric data comprises an image of handwriting of the payment recipient or an image known by the user to be associated with the payment recipient.

20. The non-transitory machine-readable medium of claim 16, wherein the operations further comprise receiving an account number of the user, wherein the identification information comprises a telephone number of the payment recipient, and wherein the third request for the biometric data is determined based at least in part on the account number and the telephone number.

21. The non-transitory machine-readable medium of claim 16, wherein the operations further comprise receiving an account number of the user, wherein the identification information comprises an email address of the payment recipient, and wherein the third request for the biometric data is determined based at least in part on the account number and the email address.

* * * * *